US007585551B2

(12) United States Patent
Tsai et al.

(10) Patent No.: US 7,585,551 B2
(45) Date of Patent: Sep. 8, 2009

(54) POLYIMIDE RESIN POLYMER AND ALIGNMENT FILM MATERIALS CONTAINING SAME FOR LIQUID CRYSTAL DISPLAY

(75) Inventors: Ming-Ruei Tsai, Kaohsiung (TW); Wen-Chung C Chu, Kaohsiung (TW); Chang Chia-Wen, Kaohsiung (TW); Lai Ming-Chih, Kaohsiung (TW)

(73) Assignee: Daxin Materials Corporation, Hsinchu County (TW)

( * ) Notice: Subject to any disclaimer, the term of this patent is extended or adjusted under 35 U.S.C. 154(b) by 0 days.

(21) Appl. No.: 11/824,205

(22) Filed: Jun. 29, 2007

(65) Prior Publication Data

US 2008/0020149 A1 Jan. 24, 2008

(30) Foreign Application Priority Data

Jun. 30, 2006 (TW) .............................. 95124014 A

(51) Int. Cl.
*C09K 19/00* (2006.01)

(52) U.S. Cl. ...................................... 428/1.26; 528/310

(58) Field of Classification Search .................. 428/1.2, 428/1.26

See application file for complete search history.

(56) References Cited

U.S. PATENT DOCUMENTS 5,276,132 A * 1/1994 Nishikawa et al. .......... 528/353
5,700,860 A * 12/1997 Nishikawa et al. .......... 524/317
5,969,055 A * 10/1999 Nishikawa et al. .......... 525/419
2004/0102603 A1* 5/2004 Chu et al. ................... 528/353

* cited by examiner

*Primary Examiner*—Randy Gulakowski
*Assistant Examiner*—Shane Fang
(74) *Attorney, Agent, or Firm*—Ladas and Parry LLP

(57) ABSTRACT

The invention relates to a polyimide resin polymer which contains at least one repeating unit selected from those of formula (A-1) and formula (A-2) below as polymerization units, (A-1)

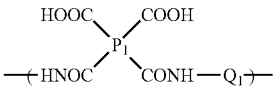

(A-2)

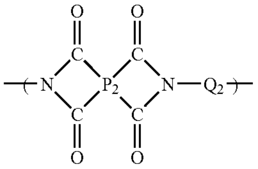

wherein $P_1$, $P_2$, $Q_1$, and $Q_2$ are as defined in the specification. The polymer of the invention can be used as an alignment material in liquid crystal displays.

13 Claims, No Drawings

POLYIMIDE RESIN POLYMER AND ALIGNMENT FILM MATERIALS CONTAINING SAME FOR LIQUID CRYSTAL DISPLAY

FIELD OF THE INVENTION

The invention provides a polyimide polymer containing a structure derived from certain diamines. The polymer can be used a vertical alignment type alignment film material for liquid crystals so as to impart the liquid crystals good vertical orientation and stability.

DESCRIPTION OF THE PRIOR ART

Liquid crystal displays are based on photoelectric change of liquid crystals, which are recently becoming prevalent in the field of flat panel displays due to their attractive advantages including small volume, light weight, low power consumption, and good display quality, and the like.

In liquid crystal display devices, a typical liquid crystal element is twisted nematic (TN) field effect liquid crystal element that uses positive dielectric anisotropic nematic liquid crystals. In general, the liquid crystal molecules are disposed between a pair of substrates with electrodes, and the alignment directions of these two substrates are vertical to each other, so that the arrangement manner of the liquid crystal molecules can be controlled by controlling the electric field. With regard to this type of liquid crystal element, it is very important that the long axis directions of the liquid crystal molecules are aligned to the surfaces of substrates at a uniform tilt angle, and the materials that enable the liquid crystal molecules to be aligned in a uniform pretilt angle alignment are referred to as alignment films.

Presently, there are two typical methods to prepare alignment films in the industry.

The first method is to produce an inorganic film from an inorganic substance by vapor deposition, for example, by oblique evaporation of silicon dioxide onto a substrate to form a thin film, whereby the liquid crystal molecules being aligned in the evaporation direction. Though this method can provide a uniform alignment, its industrial benefits are relatively poor.

In the second method, an organic film is applied onto the surface of a substrate, and rubbed with a soft cloth of cotton, nylon, or polyester so that the surface of the organic film is oriented and the liquid crystal molecules are aligned in the rubbing direction. A uniform alignment can be obtained readily with this method and this method has been used most widely in industrial scale due to its ease to be performed. Among the polymers from which an organic thin film may be produced, for example, polyvinyl alcohol, polyethylene oxide, polyamide, or polyimide, polyimide is used most commonly as alignment film material due to its chemical stability and thermal stability and the like.

The alignment film materials can be respectively used in twisted nematic (TN) mode, supertwisted nematic (STN) mode, and thin film transistor (TFT) mode liquid crystal displays, depending on different product applications. In addition to the alignment property and good coating property, the pretilt angle property is also important for an alignment film. Presently, many methods have been described in the art to control the pretilt angle. For example, EP60485-A discloses using a siloxane copolymer as an alignment film material, wherein the pretilt angle was controlled by the amount of siloxane. However, the materials disclosed therein are only suitable for supertwisted nematic mode liquid crystal displays and thin film transistor liquid crystal displays that have wide viewing angles. JP H05-313169 discloses the control of alignment films by adjusting the extent of the ring closure reaction of the polyamic acid solution into the corresponding polyimide. However, the method is only suitable for high pretilt angle. JP H07-287235 discloses using a polyamide terminated with a linear alkyl and a polyamic acid with an aliphatic tetracarboxylic acid structure as alignment film components to increase the pretilt angles. However, the alignment film is only suitable for supertwisted nematic mode liquid crystal displays.

As for the orientation processing to achieve a uniform orientation, a polyimide rubbing process has been proposed, which provides excellent thermal stability and durability. For this rubbing process, a variety of methods have been proposed to increase the pretilt angles. For example, an orientation agent for liquid crystals is suggested in JP H01-262527 and H01-262528, which is a mixture of a linear alkyl compound and a polyimide resin precursor. Further, JP H01-25126 and H04-7333 suggest that a high pretilt angle can be achieved by using diamines with an alkyl group as the raw materials for the production of polyimide. Thus, the polyimide rubbing process significantly improves the stable and uniform orientation of TN liquid crystal element that uses positive dielectric anisotropic liquid crystals.

On the other hand, several kinds of field effect liquid crystal elements that use negative dielectric anisotropic liquid crystal molecules have been known, such as electrically controlled birefringence mode (ECB mode) elements. The liquid crystal molecules in these elements are vertically aligned on the opposite electrode substrates, so as to utilize the changes in birefringence when the voltage is applied to the liquid crystal layer. For the use of the negative dielectric anisotropic liquid crystals, it is important that the short axes of the liquid crystal molecules are uniformly oriented along the substrate surface in parallel with the latter and the liquid crystal molecules are oriented at a vertical angle to the substrate. As for the process to achieve vertical, uniform orientation, it has been proposed that the substrates can be treated with an amphoteric surfactant, such as lecithin or cetyl trimethylammonium bromide, or with a solution of an organic silane coupling agent with a linear alkyl group. TW 279170 discloses an orientation method, in which low molecular weight compounds with a linear alkyl group are used to treat electrode substrates to provide stable and uniform orientation, to impart the ECB mode elements that use negative dielectric anisotropic liquid crystals with uniform orientation. However, because of the limitation on the amount of the long-chain alkyl, the increase in the pretilt angles is limited; then again, the manufacture costs are increased due to the increased proportion of the diamine monomers to be added. Further, TW 583426 discloses an aligning agent for liquid crystals that provides vertical alignment by means of the irradiation of polarized ultraviolet light; however, in order to obtain good vertical alignment property, it is necessary to perform the polarized ultraviolet light irradiation to generate the alignment and to use the diamine compounds in a higher molar ratio, thus, the method is limited in use.

SUMMARY OF THE INVENTION

An object of the invention is to provide a polyimide resin polymer containing a structure derived from certain aromatic diamines.

Another object of the invention is to provide an alignment film material containing the polymer as described above for vertically aligning liquid crystals.

DETAILED DESCRIPTION

The invention provides a polyimide resin polymer which contains at least one repeating unit selected from those of formula (A-1) and formula (A-2) below as polymerization units, (A-1)

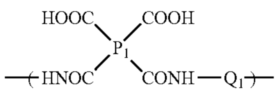

wherein, $P_1$ is a tetravalent organic radical, and $Q_1$ is a group of formula (Q-1) or formula (Q-2) below;

(A-2)

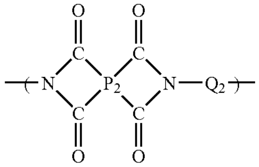

wherein, $P_2$ is a tetravalent organic radical, and $Q_2$ is a group of formula (Q-1) or formula (Q-2) below; the structure of the formula (Q-1) is:

(Q-1)

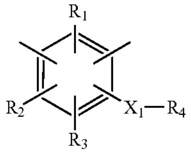

wherein $R_1$, $R_2$, and $R_3$ independently represent hydrogen, halogen, $C_1$-$C_{10}$ alkyl or a monovalent, fluorine-containing $C_1$-$C_{10}$ organic radical, with the proviso that $R_1$, $R_2$, and $R_3$ cannot all represent hydrogen;

$X_1$ is —COO—, —O—, —CO—, —OCO—, —NHCO—, —CONH— or —S—; and $R_4$ is a monovalent $C_1$-$C_{40}$ organic radical with an aliphatic or an aromatic or both skeletons; and the structure of the formula (Q-2) is:

(Q-2)

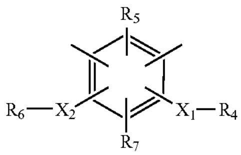

wherein $R_5$ and $R_7$ independently represent hydrogen, halogen, $C_1$-$C_{10}$ alkyl or a monovalent, fluorine-containing $C_1$-$C_{10}$ organic radical;

$R_6$ is $C_1$-$C_{10}$ alkyl or a monovalent, fluorine-containing $C_1$-$C_{10}$ organic radical;

$X_2$ is O or S; and $X_1$ and $R_4$ are as defined above.

The groups of the formula (Q-1) and the formula (Q-2) are derived from the diamine monomer compounds used to synthesize the polyimide resin, that is, derived from the diamine monomers which can provide the groups of formula (Q-1) and formula (Q-2).

Preferred embodiments of the group of formula (Q-1) include the groups of formula (1):

formula (1)

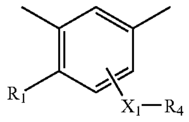

wherein $R_1$ is $C_1$-$C_6$ alkyl (preferably $C_1$-$C_3$ alkyl) or $C_1$-$C_3$ perfluoroalkyl;

$X_1$ is —COO— or —O—; and $R_4$ is a monovalent $C_{15}$-$C_{40}$ organic radical containing an aliphatic or aromatic or both skeletons;

More preferred are the groups shown as formula (2) to formula (7):

Formula (2)

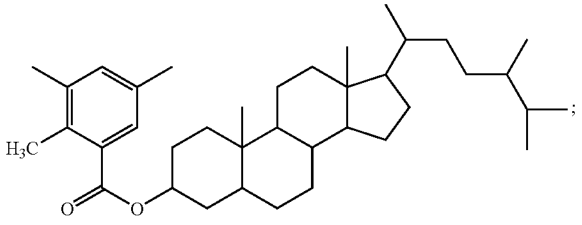

formula (3)

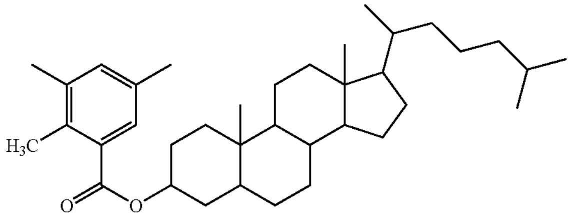

Formula (4)

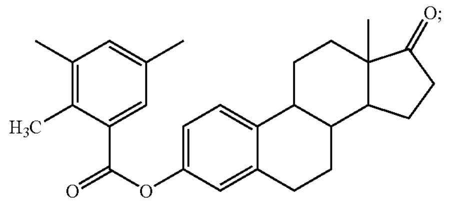

formula (5)

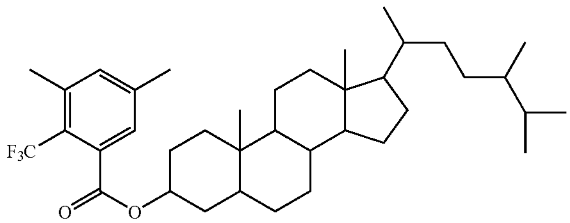

-continued

Formula (6)

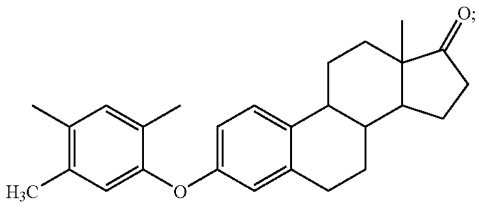

; and formula (7)

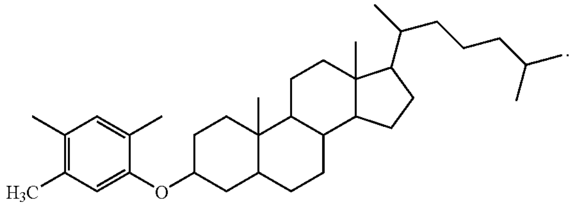

.

Preferred embodiments of the group of formula (Q-2) above include the groups shown as formula (8) below:

formula (8)

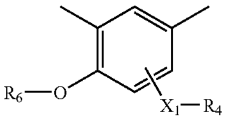

wherein $X_1$ is —COO— or —O—;

$R_4$ is a monovalent $C_{15}$-$C_{40}$ organic radical containing an aliphatic or aromatic or both skeletons; and $R_6$ is $C_1$-$C_6$ alkyl (preferably $C_1$-$C_3$ alkyl) or $C_1$-$C_3$ perfluoroalkyl;

More preferred are the groups shown as formula (9) to formula (13):

Formula (9)

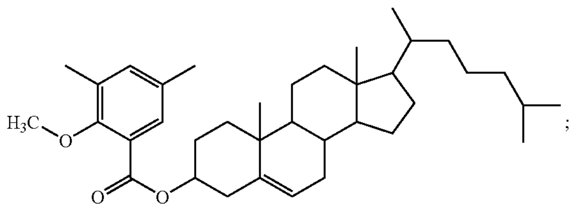

;

formula (10)

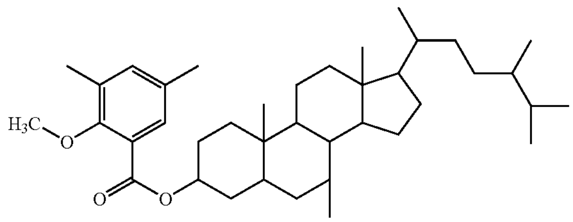

-continued

Formula (11)

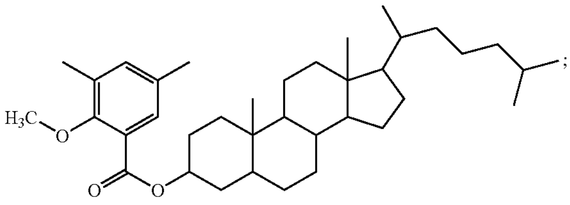

;

formula (12)

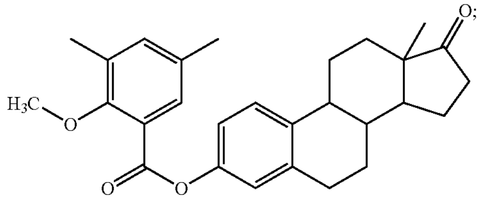

; and

Formula (13)

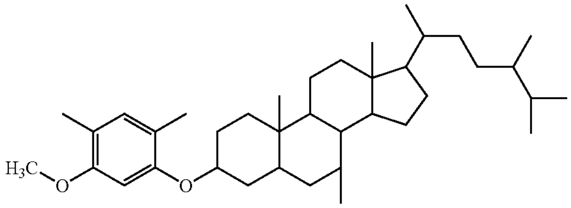

In addition to the diamine monomers that provide the groups of formula (Q-1) and formula (Q-2), other conventional diamine monomers can also be used in the invention, provided that the effect of the invention will not be adversely affected. These conventional diamine monomers may be selected from aromatic diamines, such as, but not limited to, p-phenylene diamine, diamino diphenyl methane, diamino diphenyl ether, 2,2-diamino phenyl propane, bis(3,5-diethyl-4-aminophenyl)methane, diamino diphenyl sulfone, diamino benzophenone, diamino naphthalene, 1,4-bis(4-aminophenoxy)benzene, 1,3-bis(4-aminophenoxy)benzene, 4,4-bis(4-aminophenoxy)diphenyl sulfone, 2,2-bis(4,4-aminophenoxyphenyl)propane, 2,2-bis(4-aminophenyl) hexafluoropropane, and 2,2-bis(4,4-aminophenoxyphenyl) hexafluoropropane; aliphatic cyclic diamines, such as bis(4-aminocyclohexyl)methane or bis(4-amino-3-methylcyclohexyl)methane; or aliphatic diamines, such as tetramethylenediamine or hexamethylenediamine. The diamine monomers described above can be used alone, or used in the form of a mixture of two or more of these diamines.

The diamine monomers used in the invention must comprise at least one certain diamine monomer that can provide the group of formula (Q-1) or formula (Q-2), the amount of which is at least 4 mol %, preferably at least 10 mol %, more preferably at least 50 mol %, based on the total amount of the diamine monomers, for the purpose of a sufficient vertical alignment effect.

The tetracarboxylic acid compounds used in the polymerization with the diamine monomers above to form the resin polymers of the invention are not particularly limited, which can be aromatic tetracarboxylic acids, such as, but not limited to, 1,2,4,5-pyromellitic acid, 3,3',4,4'-diphenyltetracarboxylic acid, 2,3,3',4-diphenyltetracarboxylic acid, bis(3,4-dicarboxylphenyl)ether, 3,3',4,4'-benzophenone tetracarboxylic acid, bis(3,4-dicarboxylphenyl)sulphoxide, bis(3,4-dicarboxylphenyl)methane, 2,2-bis (3,4-dicarboxylphenyl)propane, 1,1,1,3,3,3-hexafluoro-2,2-bis(3,4-dicarboxylphenyl) propane, bis(3,4-dicarboxylphenyl)dimethylsilane, bis(3,4-dicarboxylphenyl)diphenylsilane, 2,3,4,5-pyridine tetracarboxylic acid, or 2,6-bis(3,4-dicarboxylphenyl)pyridine, as well as the dianhydrides and diacyl halides derived from the aromatic tetracarboxylic acid compounds; aliphatic cyclic tetracarboxylic acid compounds, such as cyclobutane tetracarboxylic acid, cyclopentane tetracarboxylic acid, cyclohexane tetracarboxylic acid, 1,3,5-tricarboxylcyclopentyl acetic acid, or 3,4-dicarboxyl-1,2,3,4-tetrahydro-1-naphthalene succinic anhydride, as well as the dianhydrides and diacyl halides derived from the aliphatic cyclic tetracarboxylic acid compounds; aliphatic tetracarboxylic acid compounds, such as butane tetracarboxylic acid and the dianhydride and dicarboxylic acid dihalide derived therefrom. These tetracarboxylic acids and the dianhydrides and diacyl halides thereof can be used alone, or used in the form of a mixture of two or more of these monomers.

According to an embodiment of the invention, preferred tetracarboxylic acid monomer compounds used in the invention include:

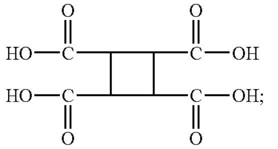

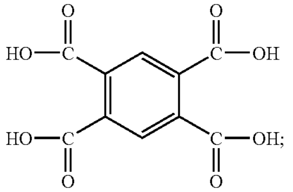

and

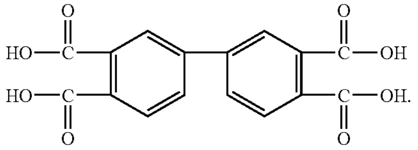

There are on particular limitations on the reaction and the polymerization between the tetracarboxylic acids or the dianhydrides or diacyl halides derivative thereof and the diamines. Any conventional processes may be used. In a conventional process, a diamine is dissolved in an organic polar solvent, such as N-methyl-2-pyrrolidone, N,N-dimethyl acetamide, or N,N-dimethyl formamide or a mixture thereof, and then a tetracarboxylic acid or the dianhydride or diacyl halide derivative thereof is added to the diamine solution to conduct a polymerization reaction so as to afford a polyamic acid solution. This reaction is carried out at a temperature from −20° C. to 150° C., preferably from −5° C. to 100° C.; and the time required for the polymerization to form a polyamic acid generally is from 3 min to 24 h, preferably from 10 min to 6 h.

In the alignment film materials of the invention, the molar ratio of the tetracarboxylic acid or the derivative thereof to the diamine is from 0.8 to 1.2 such that an appropriate molecular weight distribution and strength of the polyamic acid can be obtained. The more the molar ratio of the tetracarboxylic acid or the derivative thereof to the diamine is close to 1, the more the molecular weight and the viscosity of the obtained polymer is. When the molar ratio of the tetracarboxylic acid or the derivative thereof to the diamine is less than 1, an appropriate amount of an end cap functional group can be added to compensate for the difference, thereby avoiding the oxidation due to the molar ratio of less than 1. Suitable end cap functional groups are selected from phthalic anhydride, maleic anhydride, aniline, and cyclohexylamine.

Further, a catalyst may be added during the reaction to increase the degree of polymerization and reduce the reaction time of the polymerization of the invention. Suitable catalysts can be selected from, but are not limited to triethylamine, diethylamine, n-butylamine, and pyridine etc. These catalysts also functions to adjust the pH value of the solution.

After the polymerization, a polyamic acid is obtained, with a polymerization degree of from 6 to 3,000, preferably from 12 to 200, and a weight average molecular weight of from 3,000 to 1,500,000, desirably from 6,000 to 100,000.

In order to improve the adhesion of the polyamic acid resin alignment film materials to a substrate, a minor amount of an additive, such as a silane coupling agent, can be added to the resin. Common silane coupling agents include, for example, but are not limited to 3-aminopropyltrimethoxysliane, 3-aminopropyl triethoxysilane, 2-aminopropyl trimethoxysilane, and 2-aminopropyl triethoxysilane, and a mixture thereof.

The solids content of the polyamic acid obtained from the polymerization, i.e., the weight percent of the polymer relative to the solvent, may be in the range from 10% to 30%. However, for the alignment film materials of the invention, the solids content can be reduced to be in the range from 4 wt % to 10 wt % by dilution with an organic solvent so as to adjust the viscosity and to control the film thickness, thereby facilitating subsequent processing process of the alignment film. Suitable organic solvents may be selected from N-methyl-2-pyrrolidone, m-cresol, γ-butyrolactone, N,N-dimethyl acetamide, and N,N-dimethyl formamide, and a mixture thereof. Even for those solvents incapable of dissolving the polyimide resin, they can also be added to the above solvents, as long as they don't result in a poor solubility of the polyimide resin in the solution system. Such solvents include, for example, but are not limited to, ethylene glycol monoethyl ether, ethylene glycol monobutyl ether, diethylene glycol monobutyl ether, diethylene glycol monoethyl ether, butyl carbitol, ethyl carbitol acetate, and ethylene glycol, and a mixture thereof. The amount of this kind of solvent should preferably be controlled below 90% based on the total weight of the solvent system.

According to the embodiment of the invention, a dianhydride is added to a solution of a diamine in a solvent at a controlled temperature as needed to afford a polyamic acid resin or a polyimide resin or their copolymer. For example, the reaction can be carried out at a temperature from 25° C. to 60° C. for 2 to 48 h to afford a polyamic acid resin.

In a general method for synthesizing polyimide resin, the polyamic acid resin is heated for dehydration and ring closure so as to form a polyimide resin, wherein the heating temperature may be in the range from 100° C. to 350° C., and the desirable temperature for the cyclization is from 120° C. to 320° C., and the time for the cyclization is from 3 min. to 6 h.

There are mainly two methods to synthesize the copolymer of polyimide and polyamic acid, one of which is to control the dehydration ratio by controlling the molar proportion of dehydration to afford the copolymer resin; and in the other method, a portion of the diamine and dianhydride in a specific proportion is dehydrated and cyclized, followed by the incorporation of the remaining diamine and dianhydride at room temperature for polymerization.

For the polyimide polymerization, the polymerization degree of the product is such that the product has a reduced viscosity of from 0.05 to 3.0 dl/g as measured at a concentration of 0.5 g/dl in N-methyl-2-pyrrolidone at 30° C.

The invention further provides an alignment film material comprising the polyimide resin polymer described above for vertically oriented liquid crystals. For a better vertical alignment effect, the polyimide resin polymer should be obtained from the diamine monomer capable of providing the group of the formula (Q-1) or the formula (Q-2) in an amount of at least 2 mol %, preferably at least 5 mol %, more preferably at least 25 mol %, based on the total amount of the polyimide resin polymer.

The alignment film material of the invention can be coated onto a transparent glass or plastic substrate having transparent electrodes with a commercially available coater, such as blade coater, spin coater, or roll coater; and then the solvent is evaporated by heat treatment at a temperature from 120° C. to 350° C. to form a polyimide resin film with a coating thickness of 200 to 3000 Å, which film is subsequently oriented with rubbing to form an alignment film for liquid crystals, which can impart liquid crystal molecules with stable, high pretilt angles.

To determine that the alignment film materials of the invention can impart liquid crystals with high pretilt angles, the production of liquid crystal cells and the pretilt angle test are preformed to inspect the high pretilt angle properties of the alignment film materials. The liquid crystal cell is produced by coating the surfaces of two washed indium-tin-oxide (ITO) glass sheets with the alignment film materials of the invention, in which the coating may be accomplished by blade coating, spin coating, or roll coating, and then performing prebaking and high-temperature baking to form polyimide alignment films, which upon cooling and orientation by rubbing with brush, are assembled into a liquid crystal cell. After the liquid crystals are injected into the cell, the pretilt angle is determined using a tilt angle tester, TBA.

The invention will be further described in detail by the following examples, which are only used to illustrate the invention, but are not intended to limit the scope of the invention. Any modifications and changes which can readily be made by one skilled in the art are included within the disclosure of the specification and the appended claims.

EXAMPLES

Synthesis of Diamines

1. cholesteryl 3,5-diamino-2-methylbenzoate (DAMBC)

3,5-dinitro-2-methyl benzoic acid (100 g) was placed in a 500 ml two-necked round-bottomed flask equipped with a condensation tube, to which thionyl chloride (250 ml) was added with a dropping funnel. After the complete addition, the mixture was heated to 40-120° C. for reaction for 4-20 h. After being filtered, the product was dissolved in tetrahydrofuran (300 ml), and added to a 2000 ml two-necked round-bottomed flask containing cholesterol (100 g), pyridine (20 ml), and tetrahydrofuran (300 ml). After the addition, the reaction was conducted for 12 h at 30-80° C. After the completion of the reaction, the reaction was filtered and concentrated to afford the product, cholesteryl 3,5-dinitro-2-methylbenzoate (80% yield).

The resulting cholesteryl 3,5-dinitro-2-methylbenzoate (20 g) and zinc powder (43 g) were placed in a two-necked round-bottomed flask, and tetrahydrofuran (400 ml) was added. An appropriate amount of ammonium chloride was added at room temperature, the mixture was heated to 30-80° C. to react for 2-8 h, and then the reaction was filtered to afford the product, cholesteryl 3,5-diamino-2-methylbenzoate (60% yield).

2. cholesteryl 3,5-diamino-2-methoxybenzoate (DAMOBC)

3,5-dinitro-2-methoxybenzoic acid (15 g) was placed in a 250 ml two-necked round-bottomed flask, to which thionyl chloride (20 ml) was added with a dropping funnel. After the addition, the mixture was heated to the reflux temperature for 2-12 h. The excess of thionyl chloride was then removed, and the resultant product was dissolved in tetrahydrofuran (100 ml), and added to a 1500 ml two-necked round-bottomed flask containing cholesterol (8.5 g), pyridine (15 ml), and tetrahydrofuran (100 ml). After the addition, the reaction was conducted for 2-12 h at 40-80° C. After the completion of the reaction, cholesteryl 3,5-dinitro-2-methoxybenzoate was obtained (80% yield).

The resulting cholesteryl 3,5-dinitro-2-methoxybenzoate (5 g) and organo-palladium (3 g) were placed in a 250 ml two-necked round-bottomed flask, and tetrahydrofuran (150 ml) was added. An appropriate amount of hydrazine hydrate was added at room temperature, and the mixture was heated to 40-80° C. and reacted for 4-8 h, and then cooled, filtered, and the solvent was evaporated to afford the product, cholesteryl 3,5-diamino-2-methoxybenzoate (80% yield).

3. 3,5-diamino-2-methylbenzoic acid estrone ester (DAMBE)

3,5-dinitro-2-methylbenzoic acid (10 g) was placed in a 250 ml two-necked round-bottomed flask equipped with a condensation tube, to which thionyl chloride (50 ml) was added with a dropping funnel. After the addition, the mixture was heated to 30-80° C. and reacted for 2-12 h. The excess of thionyl chloride was then removed and the reaction was allowed to return to room temperature. The product obtained was dissolved in tetrahydrofuran (20 ml), and added to a 1500 ml two-necked round-bottomed flask containing estrone (9.55 g), pyridine (10 ml), and tetrahydrofuran (50 ml) via a dropping funnel. After the addition, the reaction was conducted for 4-12 h at 40-80° C. After the completion of the reaction, the reaction was filtered and concentrated to afford the product, 3,5-dinitro-2-methylbenzoic acid estrone ester (85% yield).

The resulting 3,5-dinitro-2-methylbenzoic acid estrone ester (5 g) and zinc powder (13 g) were placed in a 250 ml two-necked round-bottomed flask, and methanol (50 ml) and tetrahydrofuran (10 ml) were added. An appropriate amount of hydrazine hydrate was added at room temperature, and the mixture was heated to 30-80° C. for 4-8 h, and then filtered. The filtrate was added to 200 ml of deionized water so as to isolate the product, 3,5-diamino-2-methylbenzoic acid estrone ester (65% yield).

Synthesis of Polyimide Resin Polymers

Example 1

1.34 g (0.0025 mol) cholesteryl 3,5-diamino-2-methylbenzoate, 5.13 g (0.0475 mol) p-phenylene diamine (PPDA), 1.94 g (0.01 mol) 1,2,4,5-pyromellitic dianhydride (PMDA), 8.1 g (0.03 mol) 3,3',4,4'-biphenyl-tetracarboxylic dianhydride (BPDA), and 1.96 g (0.01 mol) cyclobutane tetracarboxylic dianhydride (CBDA) were reacted in 61.3 g of N-methyl-2-pyrrolidone (NMP) at room temperature for 8-16 h, and then diluted by adding 326.9 g MNP to form a polyamic acid solution with a reduced viscosity of 0.2 dl/g. This solution was spin-coated at 3000 rpm onto glass substrates having transparent electrodes, and heat-treated at 200° C. for 30 min to form a polyimide resin film. After being cooled, they were assembled into a liquid crystal cell in a parallel direction using 50 μm spacers, Liquid crystals (model ZLI-4792, manufactured by Merck company) were injected into the cell, and then this element rotated between crossed nicols and was in a whole dark state. A pretilt angle of 89 was obtained as measured using a tilt angle tester, TBA.

Example 2

2.69 g (0.005 mol) cholesteryl 3,5-diamino-2-methylbenzoate, 4.94 g (0.045 mol) p-phenylene diamine, 0.97 g (0.005 mol) 1,2,4,5-pyromellitic dianhydride, 8.1 g (0.03 mol) 3,3',4,4'-biphenyl-tetracarboxylic dianhydride, and 2.58 g (0.015 mol) cyclobutane tetracarboxylic dianhydride were reacted in 21.9 g N-methyl-2-pyrrolidone (NMP) at room temperature for 4-12 h, and then diluted by adding 73.1 g MNP to form a polyamic acid solution with a reduced viscosity of 0.8 dl/g. This solution was spin-coated at 3000 rpm onto glass substrates having transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 90 was obtained as measured using a tilt angle tester, TBA.

Example 3

2.14 g (0.004 mol) cholesteryl 3,5-diamino-2-methylbenzoate, 1.72 g (0.016 mol) p-phenylene diamine, 1.55 g (0.008 mol) 1,2,4,5-pyromellitic dianhydride, and 3.24 g (0.012 mol) 3,3',4,4'-biphenyl-tetracarboxylic dianhydride were reacted in 24.4 g N-methyl-2-pyrrolidone (NMP) at room temperature for 8-12 h, and then diluted by adding 83.9 g MNP to form a polyamic acid solution with a reduced viscosity of 0.4 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 90 was obtained as measured using a tilt angle tester, TBA.

Example 4

0.67 g (0.00123 mol) cholesteryl 3,5-diamino-2-methylbenzoate, 5.26 g (0.048 mol) p-phenylene diamine, 1.97 g (0.01 mol) 1,2,4,5-pyromellitic dianhydride, 8.1 g (0.03 mol) 3,3',4,4'-biphenyl-tetracarboxylic dianhydride, and 1.72 g (0.01 mol) cyclobutane tetracarboxylic dianhydride were reacted in 25.8 g N-methyl-2-pyrrolidone (NMP) at room temperature for 12-16 h, and then diluted by adding 106.3 g MNP to form a polyamic acid solution with a reduced viscosity of 0.3 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 2.3 was obtained as measured using a tilt angle tester, TBA.

Example 5

1.1 g (0.002 mol) cholesteryl 3,5-diamino-2-methoxybenzoate, 1.93 g (0.018 mol) p-phenylene diamine, 1.57 g (0.008 mol) 1,2,4,5-pyromellitic dianhydride, and 3.24 g (0.012 mol) 3,3',4,4'-biphenyl-tetracarboxylic dianhydride were reacted in 25.8 g N-methyl-2-pyrrolidone (NMP) at room temperature for 12-16 h, and then diluted by adding 106.3 g MNP to form a polyamic acid solution with a reduced viscosity of 0.5 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 90 was obtained as measured using a tilt angle tester, TBA.

Example 6

1.076 g (0.002 mol) cholesteryl 3,5-diamino-2-methoxybenzoate, 5.26 g (0.048 mol) p-phenylene diamine, 0.97 g (0.005 mol) 1,2,4,5-pyromellitic dianhydride, 8.1 g (0.03 mol) 3,3',4,4'-biphenyl-tetracarboxylic dianhydride, and 2.58 g (0.015 mol) cyclobutane tetracarboxylic dianhydride were reacted in 59.7 g of N-methyl-2-pyrrolidone (NMP) at room temperature for 8-12 h, and then diluted by adding 318.3 g MNP to form a polyamic acid solution with a reduced viscosity of 0.1 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 89 was obtained as measured using a tilt angle tester, TBA.

Example 7

1.34 g (0.0025 mol) cholesteryl 3,5-diamino-2-methoxybenzoate, 5.13 g (0.0475 mol) p-phenylene diamine, 1.97 g (0.01 mol) 1,2,4,5-pyromellitic dianhydride, 8.1 g (0.03 mol) 3,3',4,4'-biphenyl-tetracarboxylic dianhydride, and 1.72 g (0.01 mol) cyclobutane tetracarboxylic dianhydride were reacted in 61.3 g N-methyl-2-pyrrolidone (NMP) at room temperature for 12-18 h, and then diluted by adding 249.3 g MNP to form a polyamic acid solution with a reduced viscosity of 0.8 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 89 was obtained as measured using a tilt angle tester, TBA.

Example 8

1.21 g (0.003 mol) 3,5-diamino-2-methylbenzoic acid estrone ester, 2.19 g (0.027 mol) p-phenylene diamine, 1.16 g (0.006 mol) 1,2,4,5-pyromellitic dianhydride, 4.86 g (0.018 mol) 3,3',4,4'-biphenyl-tetracarboxylic dianhydride, and 1.03 g (0.006 mol) cyclobutane tetracarboxylic dianhydride were reacted in 25.5 g N-methyl-2-pyrrolidone (NMP) at room temperature for 8-10 h, and then diluted by adding 133.3 g MNP to form a polyamic acid solution with a reduced viscosity of 0.8 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 89 was obtained as measured using a tilt angle tester, TBA.

Example 9

1.23 g (0.003 mol) 3,5-diamino-2-methylbenzoic acid estrone ester, 2.91 g (0.017 mol) p-phenylene diamine, 1.55 g (0.008 mol) 1,2,4,5-pyromellitic dianhydride, and 3.24 g (0.012 mol) 3,3',4,4'-biphenyl-tetracarboxylic dianhydride were reacted in 25.9 g N-methyl-2-pyrrolidone (NMP) at room temperature for 12-18 h, and then diluted by adding 138.3 g MNP to form a polyamic acid solution with a reduced viscosity of 0.3 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 90 was obtained as measured using a tilt angle tester, TBA.

Comparative Example 1

3.13 g (0.006 mol) cholesteryl 3,5-diaminobenzoate (CHA), 3.67 g (0.034 mol) p-phenylene diamine, 3.1 g (0.016 mol) 1,2,4,5-pyromellitic dianhydride, and 6.48 g (0.024 mol) 3,3',4,4'-biphenyl-tetracarboxylic dianhydride were reacted in 53.9 g N-methyl-2-pyrrolidone (NMP) at room temperature for 8-12 h, and then diluted by adding 287.6 g MNP to form a polyamic acid solution with a reduced viscosity of 0.2 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 89 was obtained as measured using a tilt angle tester, TBA.

Comparative Example 2

1.56 g (0.003 mol) cholesteryl 3,5-diaminobenzoate, 2.91 g (0.027 mol) of p-phenylene diamine, 0.582 g (0.003 mol) of 1,2,4,5-pyromellitic dianhydride, 4.86 g (0.018 mol) 3,3',4,4'-biphenyl-tetracarboxylic dianhydride, and 1.548 g (0.009 mol) cyclobutane tetracarboxylic dianhydride were reacted in 38.6 g N-methyl-2-pyrrolidone (NMP) at room temperature for 12-18 h, and then diluted by adding 205.7 g of MNP to form a polyamic acid solution with a reduced viscosity of 0.7 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 2.3 was obtained as measured using a tilt angle tester, TBA.

Comparative Example 3

0.78 g (0.0015 mol) cholesteryl 3,5-diaminobenzoate, 3.07 g (0.0285 mol) p-phenylene diamine, 1.1642 g (0.006 mol) 1,2,4,5-pyromellitic dianhydride, 4.86 g (0.018 mol) 3,3',4,4'-biphenyl-tetracarboxylic dianhydride, and 1.032 g (0.006 mol) cyclobutane tetracarboxylic dianhydride were reacted in 36.7 g N-methyl-2-pyrrolidone (NMP) at room temperature for 10-16 h, and then diluted by adding 195.8 g MNP to form a polyamic acid solution with a reduced viscosity of 0.2 dl/g. This solution was spin-coated at 3000 rpm onto glass substrates with transparent electrodes, and heat-treated at 200° C. for 30 min to form a polyimide resin film. After being cooled, they were assembled into a liquid crystal cell in a parallel direction using 50 μm spacers. Liquid crystals (model ZLI-4792, manufactured by Merck company) were injected into the cell, and then this element rotated between crossed nicols and was in a whole dark state. A pretilt angle of 1.2 was obtained as measured using a tilt angle tester, TBA.

TABLE I

| Example | diamines (mol %) | | | | | dianhydrides (mol %) | | | | pretilt |
|---|---|---|---|---|---|---|---|---|---|---|
| No. | DAMBC | DAMOBC | DAMBE | CHA | PPDA | PMDA | BPDA | CBDA | alignment | angle |
| Example 1 | 5 | 0 | 0 | 0 | 95 | 20 | 60 | 20 | good | 89 |
| Example 2 | 10 | 0 | 0 | 0 | 90 | 10 | 60 | 30 | good | 90 |
| Example 3 | 20 | 0 | 0 | 0 | 80 | 40 | 60 | 0 | good | 90 |
| Example 4 | 2.5 | 0 | 0 | 0 | 97.5 | 20 | 60 | 20 | poor | 2.3 |
| Example 5 | 0 | 10 | 0 | 0 | 90 | 40 | 60 | 0 | good | 90 |
| Example 6 | 0 | 4 | 0 | 0 | 96 | 10 | 60 | 30 | good | 89 |
| Example 7 | 0 | 5 | 0 | 0 | 95 | 20 | 60 | 20 | good | 89 |
| Example 8 | 0 | 0 | 10 | 0 | 90 | 20 | 60 | 20 | good | 89 |
| Example 9 | 0 | 0 | 15 | 0 | 85 | 40 | 60 | 0 | good | 90 |
| Comparative example 1 | 0 | 0 | 0 | 15 | 85 | 40 | 60 | 0 | good | 89 |
| Comparative example 2 | 0 | 0 | 0 | 10 | 90 | 10 | 60 | 30 | poor | 2.3 |
| Comparative example 3 | 0 | 0 | 0 | 5 | 95 | 20 | 60 | 20 | poor | 1.2 |

As can be seen from the results in the examples above, the alignment film materials produced from the polyimide resin polymers of the invention, wherein the amount of the certain diamine monomer providing the group of the formula (Q-1) or formula (Q-2) is at least 4 mol % based on the total amount of diamine monomers, possess good alignment properties and provide high vertical pretilt angles.

As can be also seen from the results of the comparative examples above, the commercially available alignment film materials can offer a good vertical pretilt angle, only when the amount of the particular diamine monomer (CHA) is up to 15 mol %, which requires a higher production cost.

CHA

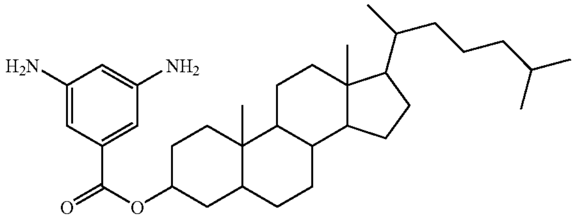

PPDA

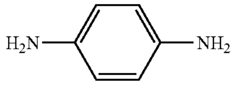

BPDA

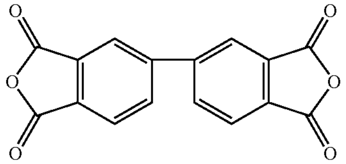

PMDA

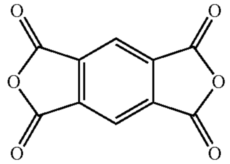

CBDA

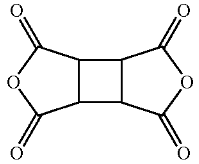

The invention claimed is:

1. A polyimide resin polymer, containing at least one repeating unit selected from those of formula (A-1) and formula (A-2), (A-1)

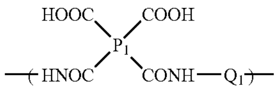

wherein, $P_1$ is a tetravalent organic radical, and $Q_1$ is a group of formula (Q-1) or formula (Q-2);

(A-2)

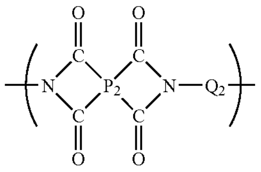

wherein, $P_2$ is a tetravalent organic radical, and $Q_2$ is a group of formula (Q-1) or formula (Q-2);

(Q-1)

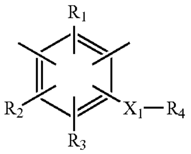

wherein $R_1$, $R_2$, and $R_3$ independently represent hydrogen, halogen, $C_1$-$C_{10}$ alkyl, or a monovalent, fluorine-containing $C_1$-$C_{10}$ organic radical, with the proviso that $R_1$, $R_2$, and $R_3$ can not all be hydrogen;

$X_1$ is —COO—, —CO—, —OCO—, —NHCO—, —CONH—, or —S—;

$R_4$ is a monovalent $C_1$-$C_{40}$ organic radical with an aliphatic or an aromatic or both skeletons; and (Q-2)

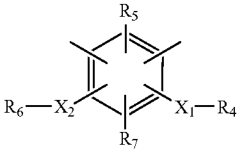

wherein $R_5$ and $R_7$ independently represent hydrogen, halogen, $C_1$-$C_{10}$ alkyl or a monovalent, fluorine-containing $C_1$-$C_{10}$ organic radical;

$R_6$ is $C_1$-$C_{10}$ alkyl or a monovalent, fluorine-containing $C_1$-$C_{10}$ organic radical;

$X_2$ is O or S; and $X_1$ and $R_4$ are as defined above.

2. The polymer according to claim 1, wherein the group of formula (Q-1) has the structure of formula (1):

formula (1)

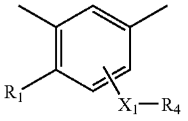

wherein $R_1$ is $C_1$-$C_3$ alkyl or $C_1$-$C_3$ perfluoroalkyl;

$X_1$ is —COO—; and $R_4$ is a monovalent $C_{15}$-$C_{40}$ organic radical with an aliphatic or an aromatic or both skeletons.

3. The polymer according to claim 1, wherein the group of (Q-1) is selected from the group consisting of:

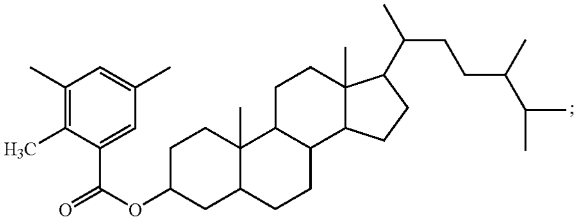

;

-continued

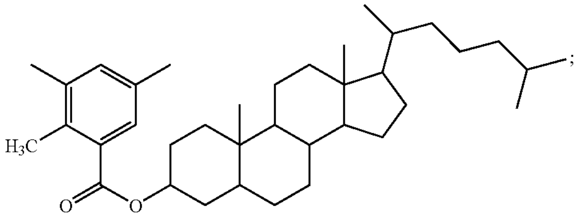

;

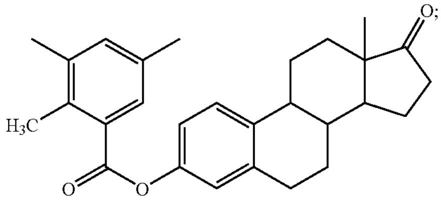

; and

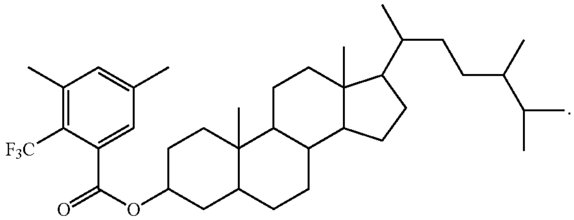

.

4. The polymer according to claim 1, wherein the group of formula (Q-2) has the structure of formula (8):

formula (8)

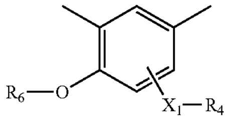

wherein $X_1$ is —COO—;

$R_4$ is a monovalent $C_{15}$-$C_{40}$ organic radical with an aliphatic or an aromatic or both skeletons; and $R_6$ is $C_1$-$C_3$ alkyl or $C_1$-$C_3$ perfluoroalkyl.

5. The polymer according to claim 1, wherein the group of (Q-2) is selected from the group consisting of:

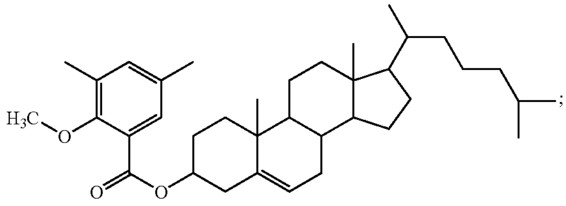

;

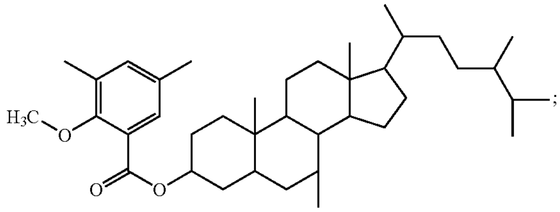

;

-continued

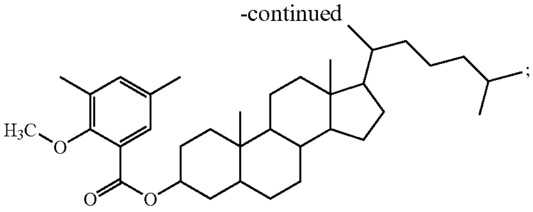

; and

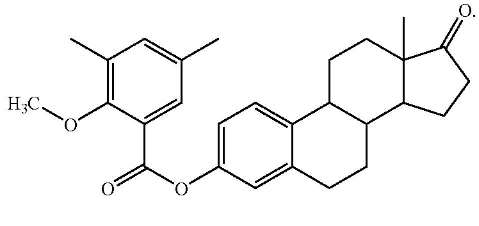

.

6. A liquid crystal display comprising liquid crystal molecules and the polymer according to claim 1 as an alignment film material for the liquid crystal molecules.

7. An alignment film material containing the polymer according to claim 1 for vertically aligning liquid crystals.

8. The alignment film material according to claim 7, which comprises at least 2 mol % of the polymer, containing at least one repeating unit selected from those of formula (A-1) and formula (A-2), (A-1)

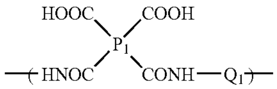

wherein, $P_1$ is a tetravalent organic radical, and $Q_1$ is a group of formula (Q-1) or formula (Q-2);

(A-2)

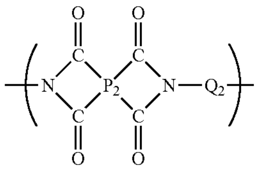

wherein, $P_2$ is a tetravalent organic radical, and $Q_2$ is a group of formula (Q-1) or formula (Q-2);

(Q-1)

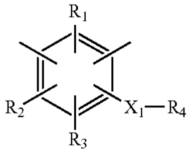

wherein $R_1$, $R_2$, and $R_3$ independently represent hydrogen, halogen, $C_1$-$C_{10}$ alkyl, or a monovalent, fluorine-containing $C_1$-$C_{10}$ organic radical, with the proviso that $R_1$, $R_2$, and $R_3$ can not all be hydrogen;

$X_1$ is —COO—, —CO—, —OCO—, —NHCO—, —CONH—, or —S—;

$R_4$ is a monovalent $C_1$-$C_{40}$ organic radical with an aliphatic or an aromatic or both skeletons; and

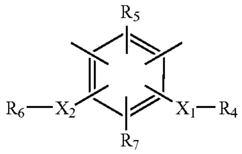

(Q-2)

wherein $R_5$ and $R_7$ independently represent hydrogen, halogen, $C_1$-$C_{10}$ alkyl or a monovalent, fluorine-containing $C_1$-$C_{10}$ organic radical;

$R_6$ is $C_1$-$C_{10}$ alkyl or a monovalent, fluorine-containing $C_1$-$C_{10}$ organic radical;

$X_2$ is O or S; and $X_1$ and $R_4$ are as defined above.

9. The polymer according to claim 1, wherein the polymer is formed with at least one diamine monomer selected from the group consisting of cholesteryl 3,5-diamino-2-methylbenzoate (DAMBC), cholesteryl 3,5-diamino-2-methoxybenzoate (DAMOBC), and 3,5-diamino-2-methylbenzoic acid estrone ester (DAMBE), wherein an amount of the at least one diamine monomer used to form the polymer is sufficient for forming an alignment film with the polymer that has a pretilt angle of at least 89, the amount of the at least one diamine monomer being at least 4 mol % based on a total amount of diamine monomers used to form the polymer.

10. The polymer according to claim 9, wherein the polymer is formed without use of cholesteryl 3,5-diaminobenzoate (CHA) or with cholesteryl 3,5-diaminobenzoate (CHA) in an amount of less than 15 mol % of a total amount of diamine monomers used to form the polymer.

11. The polymer according to claim 10, wherein the polymer is formed without cholesteryl 3,5-diaminobenzoate (CHA).

12. The polymer according to claim 9, wherein the total amount of diamine monomers consist of the at least one diamine monomer and p-phenylene diamine (PPDA).

13. The polymer according to claim 9, wherein the amount of the at least one diamine monomer is at most 15 mol % based on the total amount of diamine monomers used to form the polymer.

* * * * *

UNITED STATES PATENT AND TRADEMARK OFFICE

CERTIFICATE OF CORRECTION

PATENT NO. : 7,585,551 B2
APPLICATION NO. : 11/824205
DATED : September 8, 2009
INVENTOR(S) : Ming-Ruei Tsai et al.

It is certified that error appears in the above-identified patent and that said Letters Patent is hereby corrected as shown below:

Title Page, Item (75) Inventors:
second inventor: "Wen-Chung C Chu" should read --Wen-Chung Chu--
third inventor: "Chang Chia-Wen" should read --Chia-Wen Chang--
fourth inventor: "Lai Ming-Chih" should read --Ming-Chi Lai--

Signed and Sealed this

Ninth Day of February, 2010

David J. Kappos
*Director of the United States Patent and Trademark Office*